United States Patent [19]

Brasfield

[11] Patent Number: 4,545,020

[45] Date of Patent: Oct. 1, 1985

[54] FUEL GAGING SYSTEM

[75] Inventor: Robert G. Brasfield, Seattle, Wash.

[73] Assignee: The Boeing Company, Seattle, Wash.

[21] Appl. No.: 444,241

[22] PCT Filed: Sep. 30, 1982

[86] PCT No.: PCT/US82/01385

§ 371 Date: Sep. 30, 1982

§ 102(e) Date: Sep. 30, 1982

[87] PCT Pub. No.: WO84/01428

PCT Pub. Date: Apr. 12, 1984

[51] Int. Cl.$^4$ .............................................. G01F 23/26
[52] U.S. Cl. .................................. 364/509; 73/304 C; 73/290 R; 340/618; 340/620; 361/284; 364/571
[58] Field of Search ........................ 73/290 R, 304 C; 340/612, 618, 620; 361/284; 364/442, 509, 571

[56] References Cited

U.S. PATENT DOCUMENTS

| 2,769,338 | 11/1956 | Hermanson | 73/304 C |
|---|---|---|---|
| 2,866,337 | 12/1958 | Minneman et al. | 73/304 C |
| 3,463,980 | 8/1969 | Cohn et al. | 318/642 |
| 3,527,096 | 9/1970 | Cohn et al. | 318/642 |
| 4,090,408 | 5/1978 | Hedrick | 73/304 C |
| 4,173,893 | 11/1979 | Hedrick | 73/304 C |
| 4,235,106 | 11/1980 | Maltby et al. | 73/304 C |
| 4,258,422 | 3/1981 | Dougherty et al. | 73/304 C X |
| 4,262,531 | 4/1981 | Hewitt et al. | 73/304 C |
| 4,350,039 | 9/1982 | van Dyke et al. | 73/304 C |
| 4,383,444 | 5/1983 | Beaman et al. | 73/304 C |

FOREIGN PATENT DOCUMENTS 2459459  2/1981  France ................... 73/304 C

Primary Examiner—Errol A. Krass
Assistant Examiner—Edward R. Cosimano
Attorney, Agent, or Firm—James P. Hamley; Bernard A. Donahue

[57] ABSTRACT

A fuel gaging system of the type wherein the capacitance of a probe (20) within the fuel tank is used as an indication of fuel quantity via an assumed density/dielectric constant relationship (10) of the fuel. System accuracy is improved by directly measuring fuel density and dielectric constant. These values are compared with the assumed values in a processor (68) which generates an appropriate gaging correction signal in response to a discrepancy.

14 Claims, 15 Drawing Figures

FUEL GAGING SYSTEM

BACKGROUND OF THE INVENTION

The present invention pertains to the instrumentation art and, more particularly, to an improved fuel gaging system.

One type of fuel gaging system used extensively in commercial aircraft employs a probe (or a set of probes) in the fuel tank, the capacitance of which changes as a function of the fuel level. Such systems have been based on the assumption that fuel density and its dielectric constant are related in a closely predictable way. FIG. 1 is a plot of fuel density versus dielectric constant and illustrates a straight line plot 10 which forms the basis for one such aircraft fuel gaging system.

The assumed relationship between fuel density and dielectric constant has, in the past, resulted in gaging errors within acceptable limits, usually less than one percent. At the time such gaging systems were designed, fuel was relatively inexpensive and the cost of transporting additional onboard fuel was not thought excessive.

With increasing costs of crude oil, the cost of transporting generous reserves to accommodate a gaging error has become less acceptable. Also, as crude oil is being used from new sources and a wider range of distillation fractions in jet fuels are being employed, the gaging error due to the assumed density/dielectric constant relationship has increased. Referring again to FIG. 1, a relatively recent survey of samples of jet fuel indicates that deviations from the assumed density/dielectric constant graph 10 can be as great as is shown in points X and Y.

In addition, capacitive probe type fuel gaging systems have been susceptible to errors caused by both stray capacitance and capacitance variances as components become wetted with fuel.

A yet further problem with gaging systems used on aircraft is that gaging errors are induced by the aircraft's attitude.

There is a need, therefore, in the capacitive fuel gaging art, particularly for use in commercial aircraft, for means to correct for the above-identified errors.

SUMMARY OF THE INVENTION

It is an object of this invention, therefore, to provide apparatus for, and a method of, correcting for fuel gaging errors resulting from deviances in the assumed fuel density/dielectric constant relationship.

It is an additional object of this invention to provide the above-described fuel gaging system, which system corrects for errors caused by stray capacitance and dry-to-wetted capacitance variances.

It is a further object of this invention to provide the above-described fuel gaging system, which system includes means to correct for errors induced by the attitude of the system.

Briefly, the invention is an improvement to a fuel gaging system wherein fuel quantity is determined by measuring the capacitance of a capacitive probe in the fuel tank and relating such capacitance to fuel mass by an assumed fuel density/fuel dielectric constant relationship. The improvement includes a means for producing a signal K representative of the actual dielectric constant of the fuel, a means for producing a signal $D_A$ representative of the actual density of the fuel, and a processor for processing the K and $D_A$ signals and determining whether the assumed relationship is valid for the particular fuel in the tank and, if the assumed relationship is invalid, applying a predetermined correction signal to the gaging system such that the system indicates actual fuel mass.

DETAILED DESCRIPTION OF THE PREFERRED EMBODIMENT OF THE INVENTION

Figure 1:
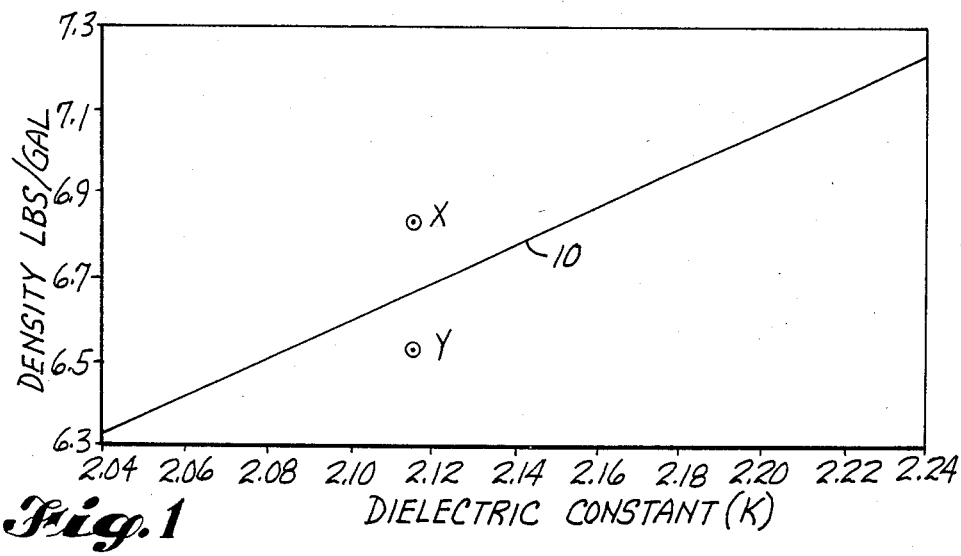
FIG. 1 is a graph illustrating the assumed relationship between fuel density and dielectric constant as used by a conventional fuel gaging system.

FIG. 1 is a graph illustrating by straight line plot 10 the relationship between fuel density and dielectric constant as assumed by the fuel gaging system in one present model commercial aircraft. The points X and Y illustrate measured fuels deviating from the assumed relationship.

Figure 2:
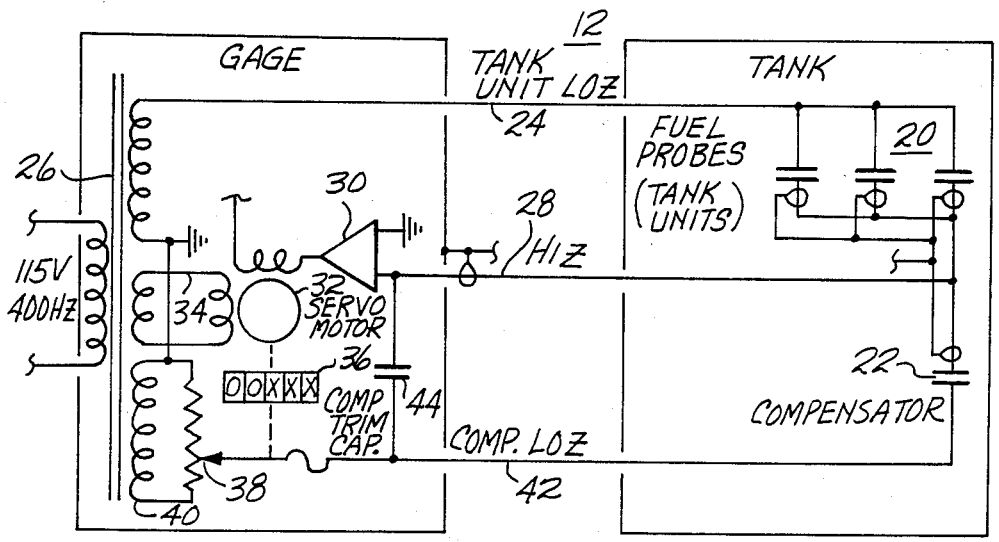
FIG. 2 is a schematic diagram of a conventional capacitive probe-type gaging system used in aircraft.

FIG. 2 illustrates a conventional capacitive probe-type aircraft fuel gaging system, indicated generally at 12. A series of capacitive probes, indicated generally at 20, are located within the fuel tanks. These tank units are typically tubular coaxial capacitors, each of a length nearly equal to the vertical dimension of the fuel tank. The capacitance of the probes 20 varies as a function of fuel level in the tank, due to the difference in dielectric constant between air and fuel.

Connected in series with the fuel probes 20 is a compensator capacitor 22. The compensator 22 is a predetermined value capacitor which is positioned in the tank such that it is submerged at any significant fuel level.

A periodic A.C. signal, here 400 Hz, is coupled to the free end of the fuel probes 20 via a tank unit low impedance (LO Z) line 24 as supplied by transformer 26 and power source (not shown). The resulting current through the fuel probes 20, which is a function of the capacitance, and thus fuel quantity in the tank, is coupled to a high impedance (HI Z) line 28 to the input of an operational amplifier 30. The operational amplifier 30 activates a servo motor 32, which motor also receives the 400 Hz signal of transformer 26 via a winding 34. The servo motor 32 drives the visual indication mechanism 36 and the tap on potentiometer 38. Potentiometer 38 is connected across an additional secondary winding 40 of transformer 26. Thus, the tap on potentiometer 38 couples a variable amplitude periodic signal, 180° out of phase with the signal on the LO Z line 24, to the free end of the compensator 22 over a compensator low impedance (LO Z) line 42. A compensation trim capacitor 44 is connected between the HI Z and compensator LO Z lines 28, 42.

Features of the system (not shown in FIG. 2) include a means to null out the dry tank capacitance of the tank probes such that the gage reads zero with no fuel in the tanks, and a means to calibrate the gage to read a certain maximum value.

In operation, as fuel level changes in the tank, the capacitance of the fuel probes 20 will vary, resulting in a change in current on the HI Z line 28. Operational amplifier 30 responds to this changed current by causing servo motor 32 to reposition the tap on potentiometer 38, and thereby the visual indicator 36, such that the current through the compensator 22 and compensation trim capacitor 44 nulls the current through the fuel probes. By proper selection of the compensation trim capacitor 44 and the compensator 22, the readout on the visual indicator 36 will correspond to the fuel mass in the tank, assuming the density/dielectric constant relationship of FIG. 1.

If the particular fuel in the tank should deviate from the assumed relationship of FIG. 1, an error is thereby introduced in the readout of indicator 36. The present invention corrects for this error, as will be understood as follows.

Figure 3:
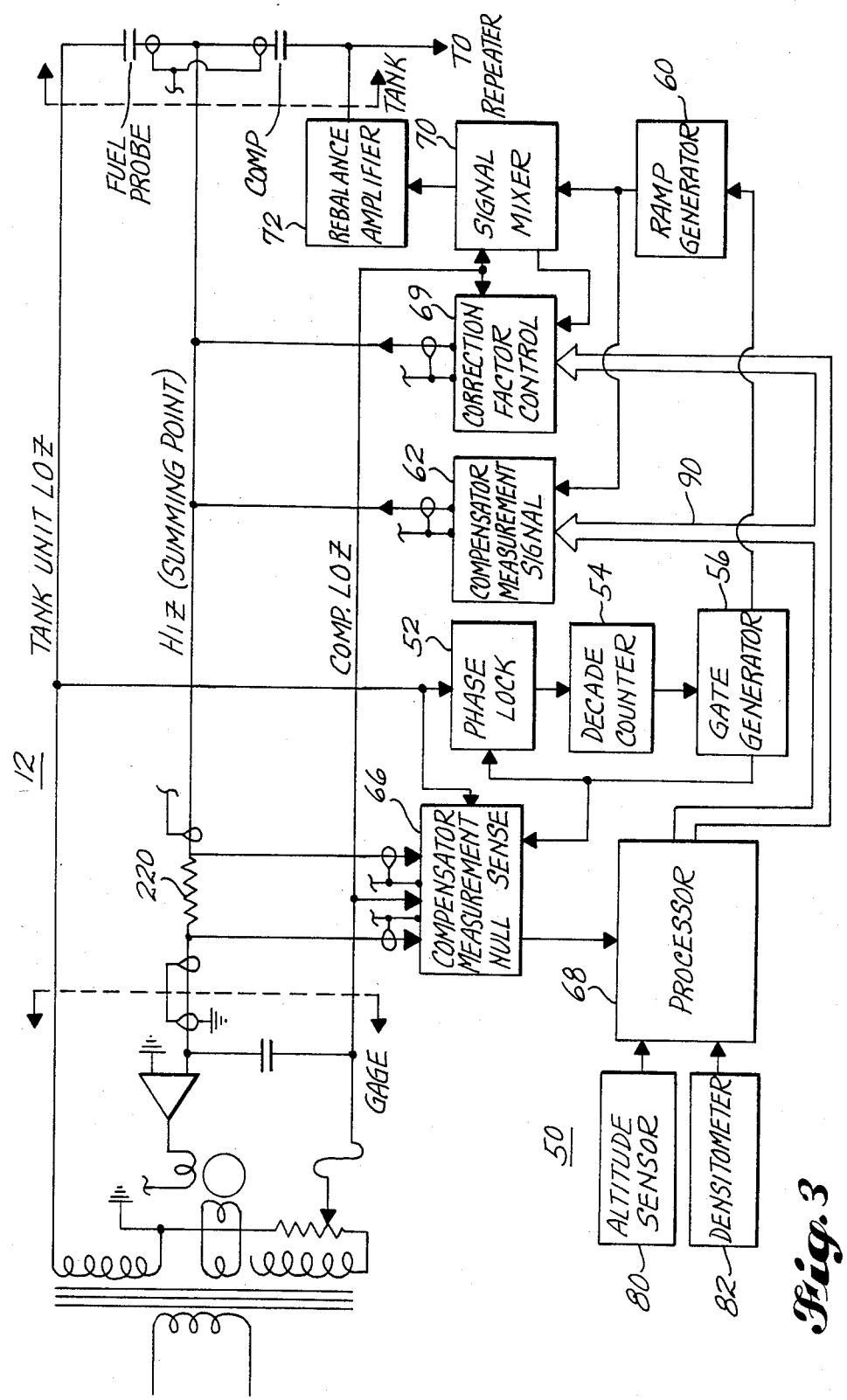
FIG. 3 illustrates by block diagram the improved fuel gaging system.

FIG. 3 illustrates the capacitive probe fuel gaging system 12 of FIG. 2, as modified by correction circuitry, indicated generally at 50. The basic operation of the correction circuitry 50 is to measure the actual density and actual dielectric constant of the fuel in the tank and compare these values to the assumed relationship, as shown in FIG. 1. If the fuel is found to deviate from the assumed relationship, an appropriate correction signal is applied to the HI Z line to effect a correct reading on the gage. In addition, the system is capable of correcting for attitude-induced errors and errors due to stray capacitance and capacitance variance due to the fuel wetting of certain system components.

In this embodiment, as will be understood in more detail with respect to the discussion hereinbelow, a multiplexing scheme is used to both balance the basic fuel gage bridge and for use in measuring the actual dielectric constant of the fuel in the tank. The dielectric constant measurement utilizes a triangular waveform with equal rise and fall times. The phasing of the triangular wave is controlled so that it exactly straddles the zero crossing points of the sinewave signal used by the fuel gage, and thus has the effect of a quadrature signal, to which the gage is not responsive. At the same time, the dielectric constant measurement system uses a synchronous full wave rectification method of detecting the triangular waves, which system effectively cancels out any sinusoidal error signals that may remain on the commonly shared summing point from an unnulled status of the fuel gage.

Figure 4:
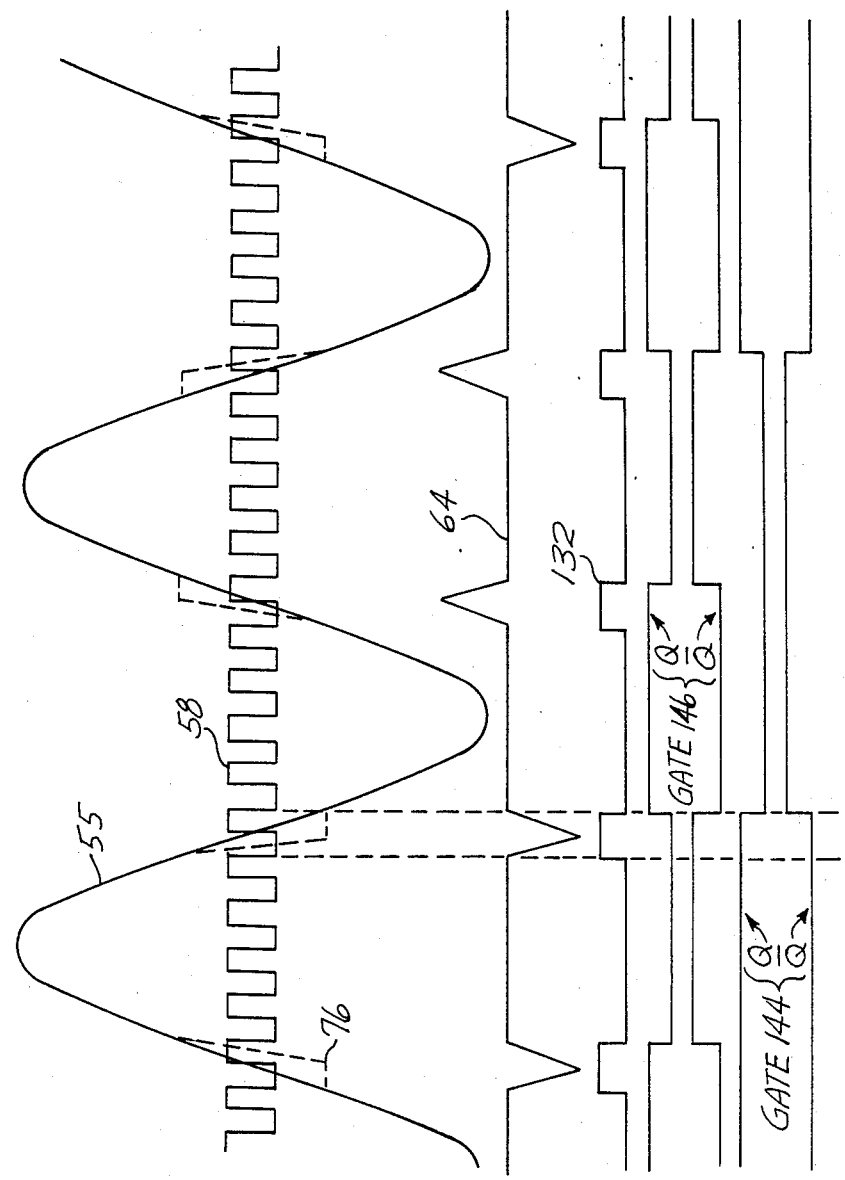
FIG. 4 illustrates various waveforms found in the apparatus of FIG. 3.

Thus, referring again to FIG. 3, the blocks labeled Phase Lock 52, Decade Counter 54, and Gate Generator 56 sense the phase of the 400 Hz sinewave voltage on the tank unit LO Z wire and generate gating signals. Referring to FIG. 4, the 400 Hz sinewave on the compensator LO Z wire is illustrated by waveform 55 and one of the aforementioned gating signals by waveform 58. As shown, the gating signals 58 are phase-locked to the 400 Hz signal 55.

The ramp generator circuit 60 of FIG. 3, along with the compensator measurement signal block 62, generate and control the triangular waveforms used to determine the compensator capacitance. The triangular waveform out of ramp generator 60, controlled in phase by gate generator 56 and coupled through the signal mixer block 70 and rebalance amplifier block 72, is shown as waveform 64 in FIG. 4.

Circuit block 66, labeled "compensator measurement null sense", is a synchronous rectifier, with associated amplifier, which detects the level of current due to the triangular wave, appearing across resistor 220 at the null input to the operational amplifier, with this level being outputted to a processor 68. The processor, in a manner described more fully hereinbelow, determines the dielectric constant of the fuel by comparing the fuel immersed capacitance of the compensator capacitor with stored data derived by a previous measurement of the compensator's dry capacitance.

Block 69 labelled "correction factor control", receives both the sinewave rebalance voltage from the gage through the compensator LO Z line and the phase inverted image of the sinewave rebalance voltage as provided by block 70, labelled "signal mixer". In response to a binary input word from the processor 68, the correction factor control block 69 determines the correct phase and proportions the correct magnitude of a sinewave correction factor which is coupled through a small capacitor to the HI Z wire.

Signal mixer block 70 receives the sinewave rebalance voltage from the compensator LO Z line and also the triangular waveform from the ramp generator 60 and produces an output waveform which is proportional to the sum of the instantaneous magnitudes of the two inputs and is of the same phase (in its sinewave component) as the gage rebalance voltage output. The triangular wave component is of opposite phase relative to the triangular wave signal applied to the HI Z wire by the compensator measurement signal block 62.

Because of voltage limitations of the integrated circuits used in this signal mixing circuit 70, the sinewave component from this block is a fixed fraction of the gage rebalance voltage output. Thus, the rebalance amplifier block 72 restores the original magnitude of the sinewave component. It also has current limiting provisions for the wire leading into the tank for reasons of safety under circuit failure conditions. FIG. 4 illustrates, in dashed line, such as at 76, the alteration of the sinewave, near the zero crossings, as found at the output of the signal mixer block 70 and rebalance amplifier block 72.

Also coupled to the input of processor 68 is the signal output from an attitude sensor 80 and the output signal from a densitometer 82. The signal from the attitude sensor is representative of attitude of the system whereas the output from densitometer 82 is a signal representative of actual density $D_A$ of the fuel.

Operation of the system shown in FIG. 3 is understood as follows. The phase lock 52, decade counter 54 and gate generator 56 circuitry cause the ramp generator 60 to generate the triangular waves at the zero crossing time of the 400 Hz sinewave. The triangular waves are routed both to the signal mixer 70 and to the compensator measurement signal circuitry 62. The signal mixer combines the triangular waves with the 400 Hz sinewave from the compensator LO Z line. The resultant signal is amplified by the rebalance amplifier 72 and applied to the free end of the compensating capacitor.

The triangle waves out of the ramp generator 60 are inverted by the compensator measurement signal block 62 and amplified by a factor determined by the microprocessor over the binary data line 90. The binary data may preferably be 12 bit data.

The compensator measurement null sense block 66 monitors the level of triangle wave signal at the input to the gage amplifier. Any triangle wave signal other than null causes a signal to be sent to the processor 68 which, in turn, varies the gain of the compensator measurement signal block 62 in a direction to tend to null the triangular wave as coupled through the compensator capacitor from the rebalance amplifier 72. The processor continues its process of varying the signal level through the compensator measurement signal block 62 until the compensator measurement null sense block 66 indicates that a null has been achieved. Now, since the processor has determined the signal required out of the compensator measurement signal circuitry 62 to effect a null, it can, by reference to previously stored data as to the "dry" capacitance of the compensator, and by a formula residing in the processor programming, determine the actual dielectric constant K of the fuel in the tank.

Inasmuch as the processor 68 is also supplied information from a conventional densitometer 82 as to the actual density of the fuel, it uses the determined dielectric constant and density measurements, compares these to the assumed relationship (as per FIG. 1) and, in the event that the actual values deviate from the assumed curve, the processor, through stored formula or a look-up table, then generates a signal on bus 90 to the correction factor control block 69. This signal, as processed by the correction factor control, couples a predetermined amount of appropriate phase 400 Hz signal to the HI Z line, which signal acts as a correction signal to correct the ultimate gage reading for the particular fuel being used.

In addition, in response to the signal from the attitude sensor 80, the processor 68, again through either a stored formula or look-up table, will cause the output on bus 90 to produce a correction signal out of block 69 such that the indicated gage reading is corrected for any errors due to attitude of the system.

Figure 5:
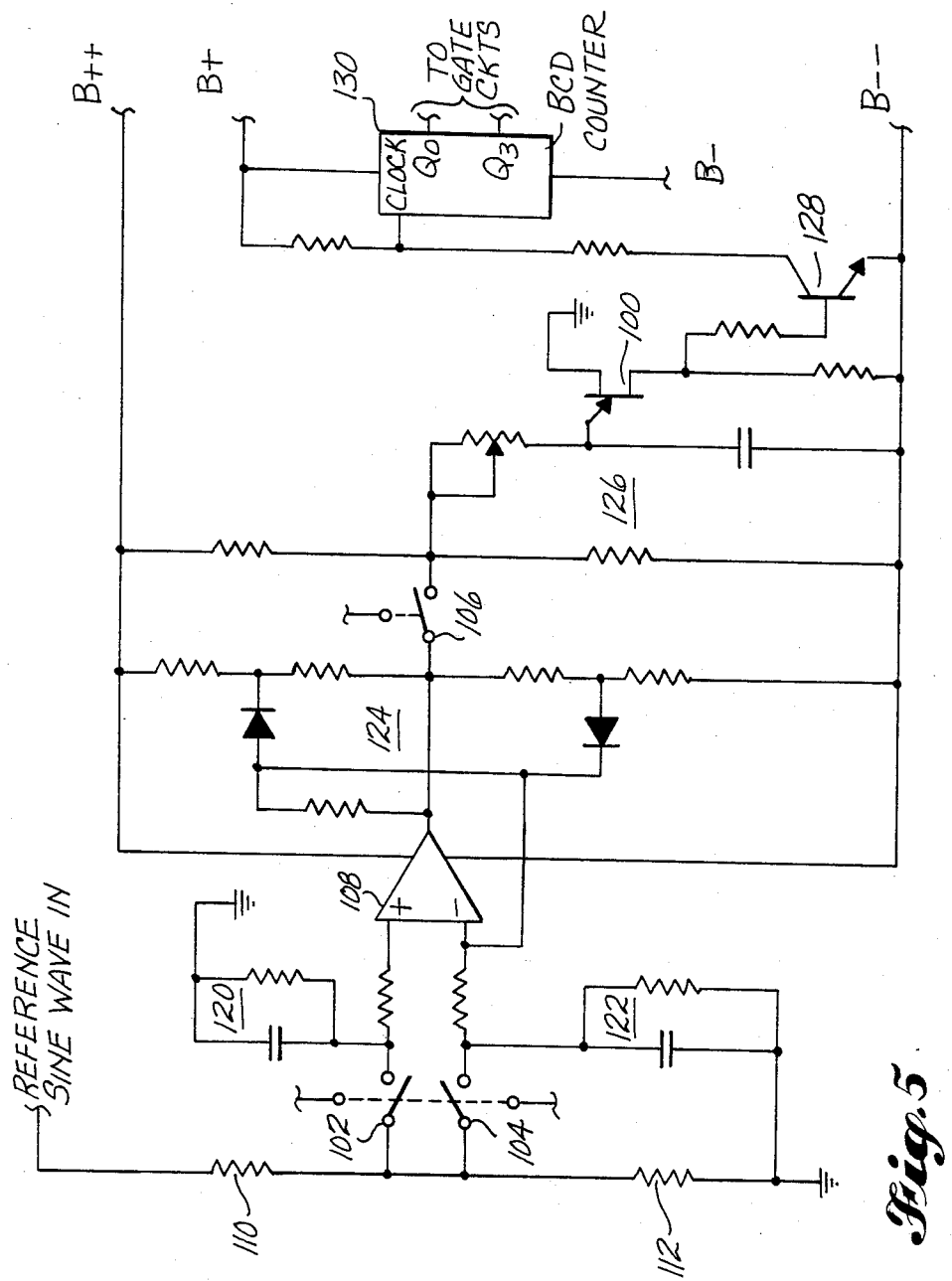
FIG. 5 is a detailed schematic diagram of the phase lock and decade counter circuitry shown in FIG. 3.

FIG. 5 is a detailed schematic diagram of the preferred embodiment of the phase lock and decade counter shown in FIG. 3. Here, a unijunction transistor 100 generates an 800'Hz pulse train which controls the phasing of all system gating waveforms. Switches 102 and 104 operate as synchronous rectifiers in a form of sample and hold circuit. When switch 106 is closed, an operational amplifier 108 modifies the oscillation period of transistor 100 to maintain the desired relationship of the gating signals with the 400 Hz sinewave. When the system is tracking the 400 Hz, switches 102 and 104 alternately sample 36° intervals, each interval starting 18° before and extending 18° after the zero crossings of the 400 Hz signal. Switch 102 is closed during the negative-to-positive zero crossings and switch 104 is closed during the positive-to-negative crossings. If the closures of switches 102 and 104 are exactly symmetrical with the zero crossings of the 400 Hz, the average voltage at the junction of resistors 110, 112 during the switch closure time will be zero and the output of amplifier 108 will be at ground potential. If the phasing or frequency of the 400 Hz changes, a D.C. error voltage will be rectified by switches 102, 104, with the polarity of the error voltage such that, when amplified by amplifier 108, the charging voltage of transistor 100 will be changed so that a lengthened or shortened oscillation period will result, tending to reduce the error voltage.

To prevent the oscillation period of transistor 100 from changing during the intervals when the sinewave zero crossing is sampled, switch 106 is opened when either switch 102 or 104 is closed. Transistor 100 generates two equal oscillation periods, then switch 106 closes and the next eight periods are modified as necessary by the output of amplifier 108.

Resistors 110 and 112 attenuate the reference sinewave to a suitable level. The zero crossing voltage samples are stored and filtered by RC filters 120, 122. A feedback path, indicated generally at 124, limits the output of amplifier 108 to remain within approximately two volts of ground potential. This is done to insure that the system, when initially out of synchronization, will approach the correct phasing with a transistor 100 frequency near the final value so that it is more likely to lock in at the first approach.

Timing circuitry, indicated generally at 126, controls the oscillation period of transistor 100 such that, when it is not modified by the output of amplifier 108, a frequency of 800 Hz is generated.

The oscillator output, as coupled through transistor 128, is applied as the clock input to a binary coded decimal counter 130. Waveform 58 of FIG. 4 illustrates the $Q_0$ output of counter 130 whereas graph 132 illustrates the waveform output at the $Q_3$ counter 130 output.

Figure 6:
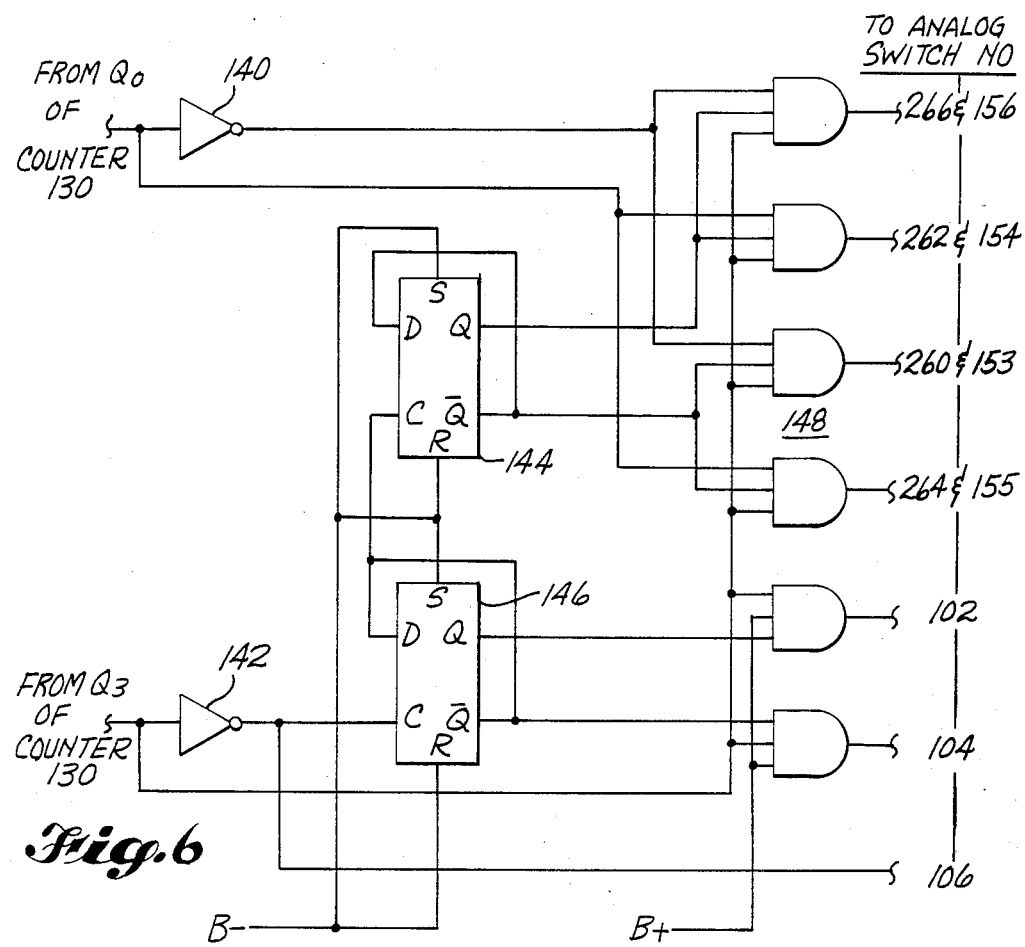
FIG. 6 is a detailed schematic diagram of the switch gating circuitry used in the circuit of FIG. 3.

FIG. 6 is a detailed diagram of the gate generator as shown in FIG. 3. Here, the $Q_0$ and $Q_3$ outputs from counter 130 (FIG. 5) are routed through a pair of inverters 140, 142, a pair of type D flip-flops 144, 146, and an "AND" output array, indicated generally at 148 to produce the gating signals used throughout the system. FIG. 4 illustrates several of the gating waveforms, and their phase relationship to the 400 Hz sinewave.

Figure 7:
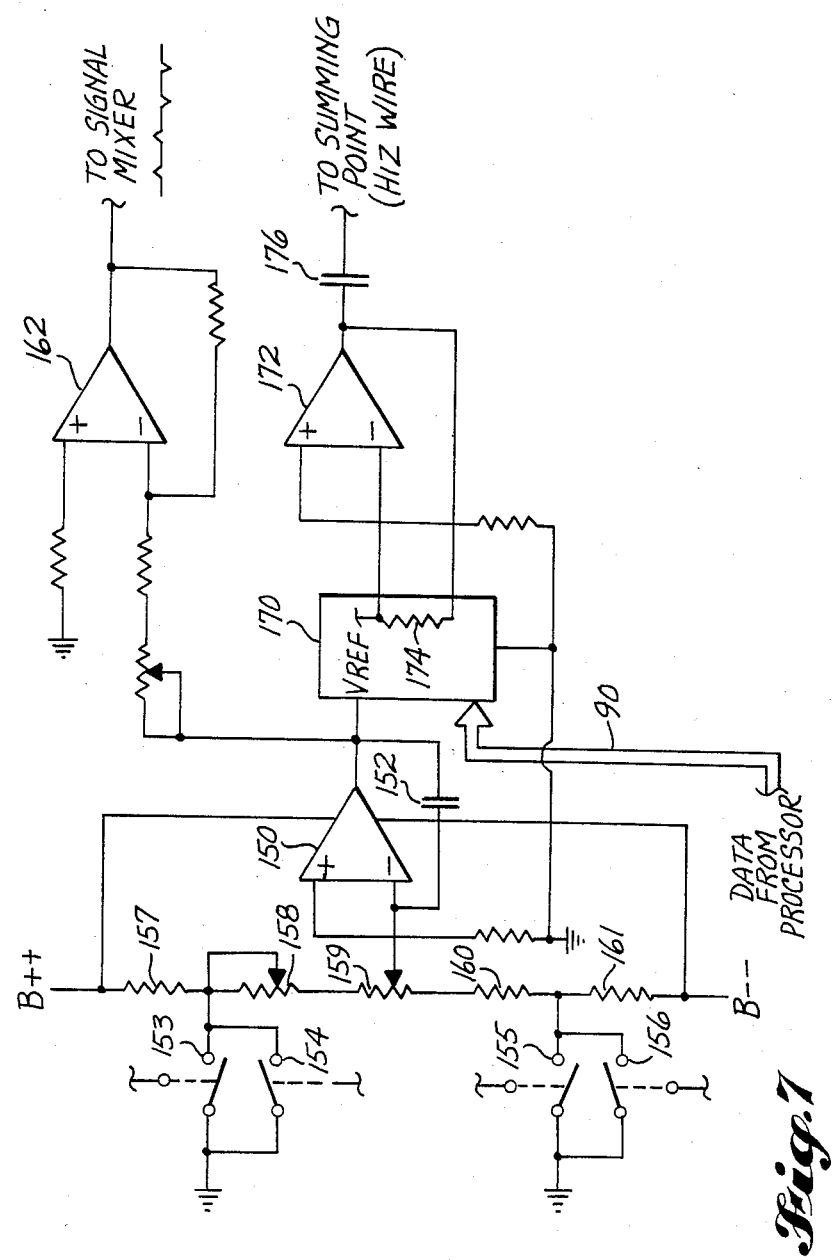
FIG. 7 is a detailed schematic diagram of the ramp generator and compensator measurement signal circuitry used in FIG. 3.

FIG. 7 is a detailed schematic diagram of the ramp generator and compensator measurement signal circuits of FIG. 3. Here, operational amplifier 150, with capacitor 152, switches 153–156, and resistors 157–161 constitute the ramp generator. When all of the switches 153–156 are open, resistor 159 is adjusted so that the output of amplifier 150 is at ground potential.

When either switch 153 or 154 is closed, the voltage at the tap of resistor 159 tends to go negative relative to ground. The negative input to the inverting terminal of amplifier 150 causes its output to rise linearly, in a positive direction, at a rate such that the current through capacitor 152 maintains the voltage at the inverting input virtually at ground potential, with only enough negative excursion to sustain the output. By a similar action, the closing of switches 155 or 156 results in a negative going linear ramp, whether ramping down from a positive voltage towards zero if immediately following closure of switches 153 or 154, or as the leading edge of a negative triangular waveform if switches 155, 156 close first. Resistor 158 enables adjustment for exactly equal negative and positive slopes so that the trailing edge of each triangular wave will arrive cleanly at zero with no overshoot or segment of lesser slope.

Amplifier 162 is a phase inverter of unity gain, used to apply the triangular waveforms in proper polarity to the signal mixer.

The compensator measurement signal circuit includes a multiplying digital-to-analog converter 170 and an amplifier 172. Converter 170 is capable of handling positive, negative or A.C. reference signal inputs, and of providing a current to amplifier 172 that is a function of both the reference voltage and binary data, input on bus 90 from the processor. Amplifier 172 converts the current input from converter 170 to a proportional voltage output using a feedback resistor 174 that is within converter 170. The output from amplifier 172 is coupled through a capacitor 176 to the HI Z wire.

Figure 8:
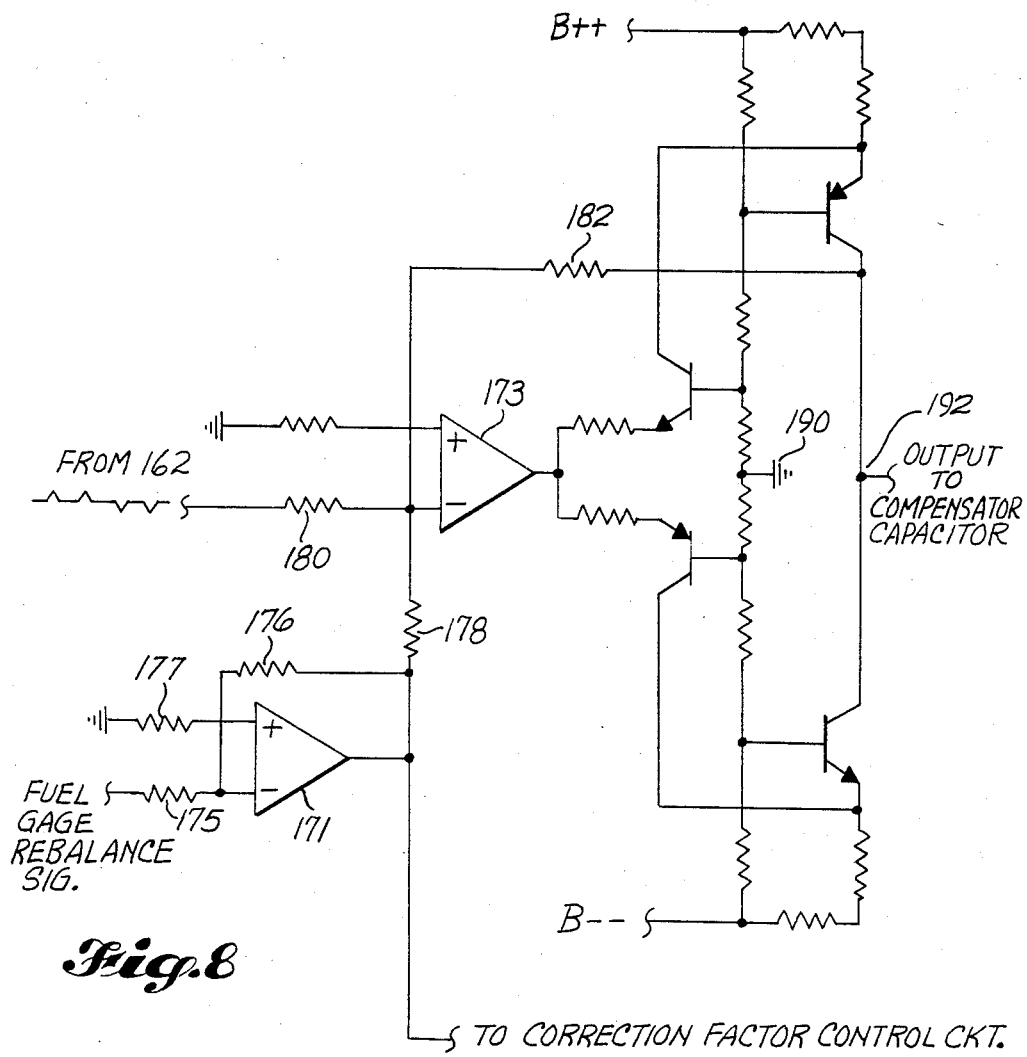
FIG. 8 is a detailed schematic diagram of the signal mixer used in FIG. 3.

FIG. 8 is a detailed schematic diagram of the signal mixer and rebalance amplifiers, shown in FIG. 3. An amplifier 171 pre-inverts the 400 Hz sinewave rebalance voltage output from the fuel gage so that, when inverted again in the signal mixer 173, it will be of the original phase. Resistors 175, 177 set the output level of amplifier 171. Resistor 178 determines the sinewave component of current flowing to the inverting input of amplifier 173, which input is a summing point for signal mixing. Resistor 180 determines the triangular wave component of current flowing to the summing point. Resistor 182 determines the output voltage that will supply a feedback current to the summing point, equal to the input currents.

The rebalance amplifier is generally indicated at 190. Its purpose is to restore the original amplitude of the 400 Hz sinewave part of its composite output with a suitably scaled triangular wave part. The rebalance amplifier is non-inverting and, thus, can be included in the feedback loop that determines the output response to summing point currents. The output from the rebalance amplifier is taken at node 192 and is coupled to the compensator capacitor.

Figure 9:
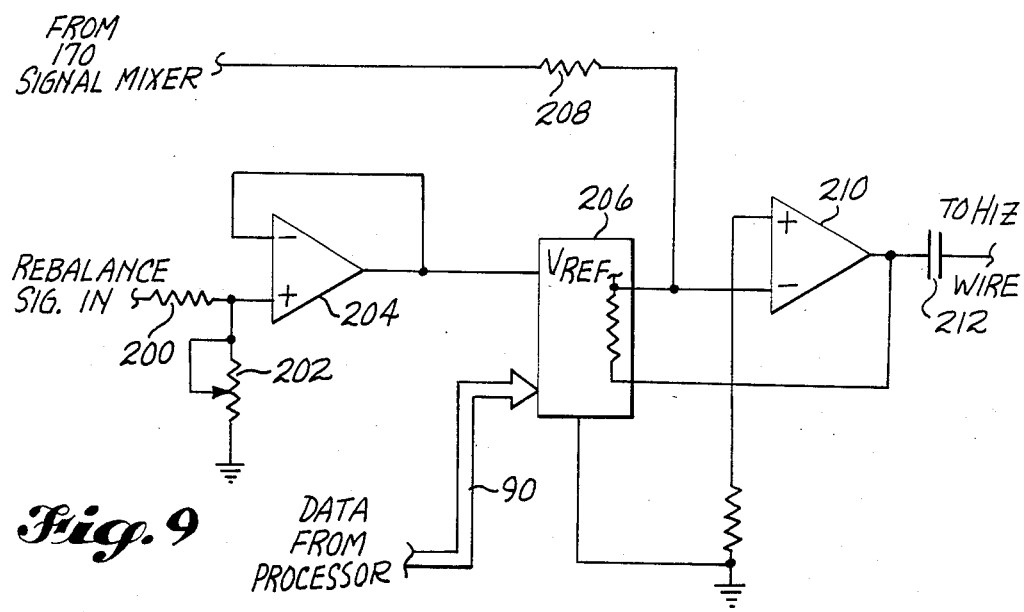
FIG. 9 is a detailed schematic diagram of the correction factor control circuitry shown in FIG. 3.

FIG. 9 is a schematic diagram of the correction factor control circuitry of FIG. 3. A pair of resistors 200, 202 divide down the output from the fuel gage rebalance potentiometer to a level suitable as $V_{ref}$ input to converter 206. The output from voltage follower amplifier 204 is coupled as an input signal to the multiplying digital-to-analog converter 206. The output from converter 206, as well as the signal through resistor 208 from the signal mixer are coupled to the inverting input of an amplifier 210. The current output of converter 206 is derived from the original phase of the rebalance voltage from the fuel gage, while the current through resistor 208 is derived from a fractional inverted image of that voltage, taken from amplifier 171 (FIG. 8) of the signal mixer. Resistor 202 is adjusted so that when the controlling binary data word from the processor on line 90 is at its median value, the two currents are equal and cancel each other. Then, no feedback current is required from the output of amplifier 210 and, as such, the output at amplifier 210 is zero. Digital data greater or less than the median value will result in a net uncancelled current of one phase or the other, with a corresponding voltage output from amplifier 210. The operation of converter 206 and resistor 208 is comparable to a potentiometer connected between two sources of equal voltage but opposite phase, with a variable tap supplying the signal to amplifier 210. Thus, under control of the processor, a variable correction factor can be applied to the gage that will cause it to add to, or subtract from, the uncorrected gage indication. The correction signal is coupled through a capacitor 212 to the HI Z wire.

Figure 10:
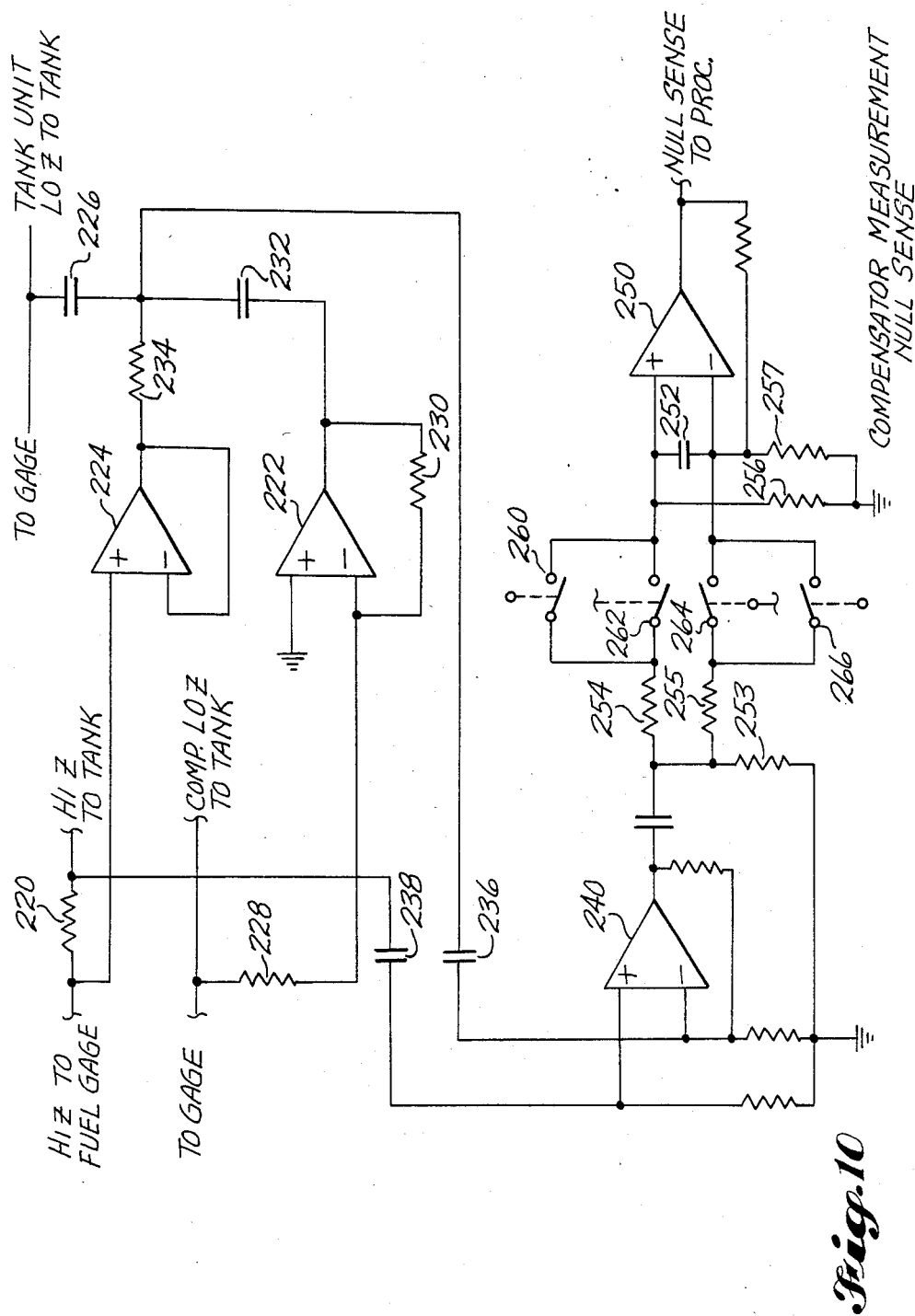
FIG. 10 is a detailed schematic diagram of the compensator measurement null sense circuitry shown in FIG. 3.

FIG. 10 is a schematic diagram of the compensator measurement null sense circuitry shown in FIG. 3. As discussed previously with respect to FIG. 3, with the fuel gaging bridge at balance, a 400 Hz sinewave current flows in the HI Z wire to the null point within the gage. In FIG. 10, resistor 220 is inserted in series with the HI Z wire to improve detection of the dielectric constant measurement error signals which appear across resistor 220 as square waves mixed with sinewaves due to the fuel gage bridge current. Amplifiers 222, 224 and capacitor 226 contribute to cancelling out the sinewave voltage. Amplifier 224 is a voltage follower which maintains, at its output, a voltage equivalent to the null point voltage within the gage. Resistors 228, 230 and amplifier 222 produce a voltage at the output of amplifier 222 which is proportional to the voltage exciting the compensation trim capacitor within the gage, but of opposite phase. Capacitor 232 is sized to make a current flow to resistor 234 that is equal to the current through the compensation trim capacitor, while capacitor 226 carries a current to resistor 234 equal to the current through the dry capacitance of the fuel probes. Resistors 220 and 234 are equal and have values low compared to the capacitive reactance such that they have minimal effect on the phase of the current they pass. The net effect of amplifiers 222, 224 and capacitor 226 is that resistors 220 and 234 carry the same sinewave voltages, but the voltage across resistor 220 is altered by the square waves of the dielectric constant measurement while the voltage across resistor 234 is free of the square wave signal. The two signals across resistors 220 and 234 are coupled by capacitors 236 and 238 to the inputs of amplifier 240, where, since the sinusoidal signal is a common mode signal, amplifier 240 amplifies the square wave difference of the two signals.

The triangular voltages applied to the compensator and to capacitor 176 of FIG. 7 (in the compensator measurement signal circuit) normally, when in balance, induce equal square waves of current flowing from the one capacitor to the other, with a null condition of voltage response to those currents existing on the HI Z wire. When the compensator measurement is not at null, part of the square wave current must flow to ground through resistor 220, thus developing a square wave voltage across resistor 220 of a polarity (or phase) determined by which current is larger, the compensator current or the current through capacitor 176.

Amplifier 250, with capacitor 252 and resistors 253–257, as well as analog switches 260, 262, 264 and 266, form a synchronous rectifier detection system that provides a signal to the processor indicating a non-nulled status, and indicating whether the compensator measurement signal current through capacitor 176 (FIG. 7) is greater or less than the triangular wave component of the compensator current.

When the triangular voltage applied to the compensator is ramping toward a more positive level, switches 260 or 262 will be closed and, when ramping toward a more negative level, switches 264 or 266 will be closed. Thus, if the compensator current is greater than the measurement current, positive square wave voltages, developed across resistor 220 and amplified by amplifier 240, will be rectified to the non-inverting input of amplifier 250, and negative square wave voltages will be rectified to the inverting input. Thus, a positive output from amplifier 250 indicates to the processor that the measurement signal needs to be increased to achieve balance, while a negative output indicates a decrease is required.

Contamination on the compensator or in the fuel may result in some resistive leakage current by-passing the compensator. Resistive current will develop a triangular voltage across resistor 220 that is either positive or negative during the entire duration of any one triangular pulse. It will be rectified in equal parts by both switches 260, 262 and 264, 266 and, thus, becomes a common mode voltage which is rejected by amplifier 250. Without this discriminatory feature, resistive leakage current might cause errors in the compensator capacitance measurement.

Another discriminatory feature enables the synchronous rectifier to reject the effect of a non-null condition of the fuel gage. During refueling the gages may be in slow continuous up-scale motion, unbalancing the sinewave voltages across resistors 220 and 234, with the result that some sine voltage is produced in the output of amplifier 240. Because the triangular waves are generated in pairs of the same polarity, whatever sinewave signal may be rectified with the first member of a pair will be negated by an opposite polarity sinewave signal rectified with the second member of the pair. Capacitor 252, with resistors 254, 255, 256 and 257, form an RC filter of long time constant so that the rectified effect of both sine and triangular waveforms is smoothed over many cycles. Alternating negative and positive pairs of the triangular pulses minimizes any tendency of the triangular wave operations to produce a D.C. offset on the HI Z wire, which might affect the fuel gage's amplifier.

When a fuel gage is first energized, with the existing position of its rebalance potentiometer not at the position that would yield a null, the initial large sinewave error signal may briefly overwhelm the sinewave discrimination, and prevent making a compensator capacitance measurement. This is of no consequence, since a non-null triangular wave cannot significantly interfere with the sinewave nulling process of the fuel gage. When the gage reaches a balance, or is slowly tracking a rising or falling fuel level, the sinewave discrimination will be effective and a triangular wave null can then be reached in a few seconds.

Figure 11:
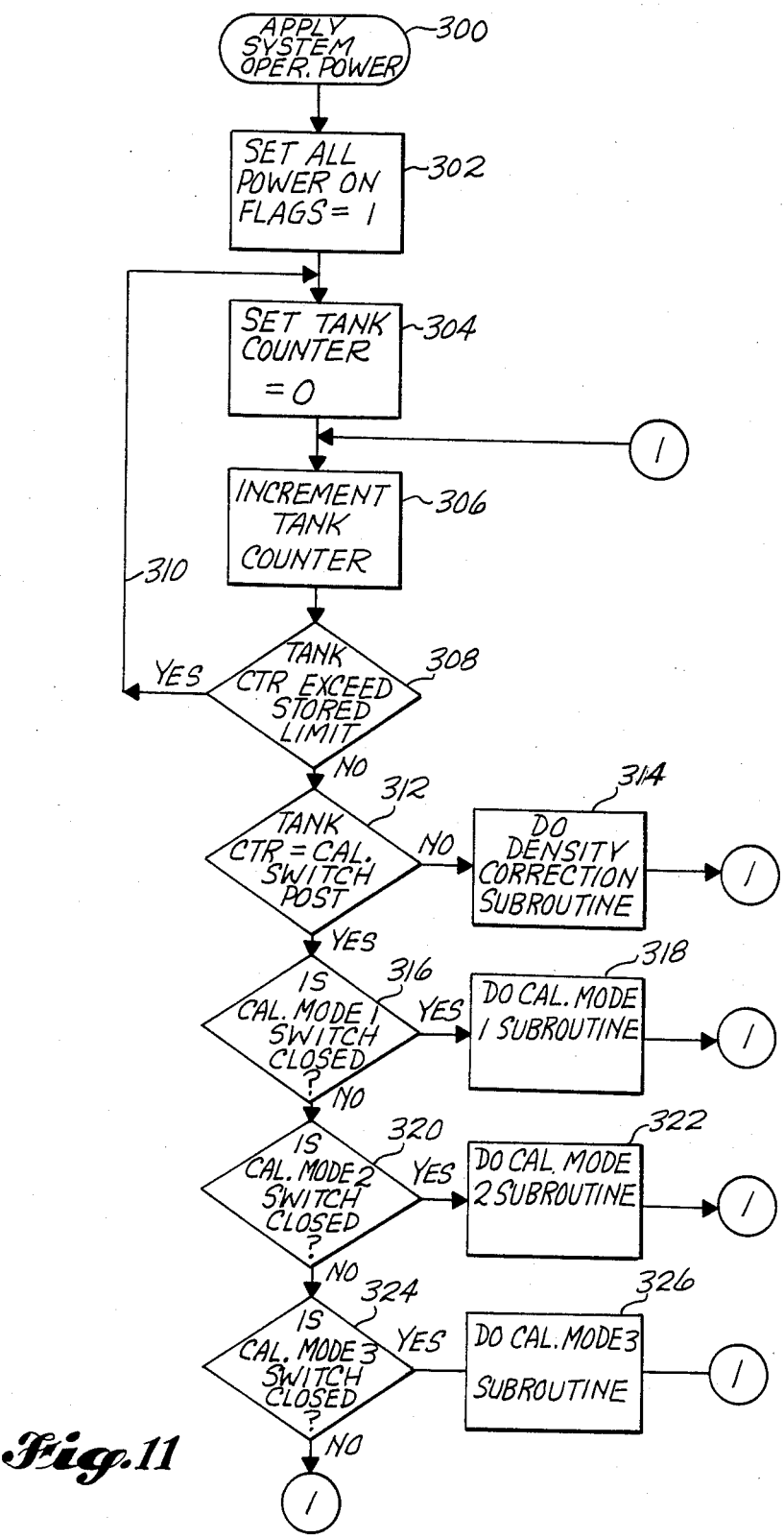
FIG. 11 is a logic flow diagram of the main program performed by the processor of FIG. 3.

FIG. 11 is a logic flow diagram of the principal program performed by the processor of FIG. 3. System power is applied at block 300, and at block 302, the power-on flags are set to 1. In a system having multiple tanks, there is one power-on flag for each tank. The power-on flags are used in the density correction routine to control the compensator capacitance measurement. In an initial system turn-on, a complete successive approximation procedure is performed to establish the binary number which represents compensator capacitance. On subsequent cycles through the program, the binary data is simply incremented or decremented as required to track the slowly changing dielectric constant of the fuel.

At block 304, the tank counter is set at zero. The tank counter determines which tank of a multi-tank system is to be operated upon in any particular pass through the main program.

This value gets incremented by one at block 306.

A determination is made at block 308 as to whether or not the tank counter exceeds the stored limit. The stored limit is the number of tanks in a multi-tank system. If the tank counter has exceeded the stored limit, a loop 310 resets the tank counter to zero at block 304. If the tank counter has not exceeded the limit, a determination is made at block 312 as to whether the tank counter equals the calibration switch position. The system includes a switch which selects a particular tank of a multi-tank system for calibration procedure. A "none" choice is also provided on the switch. The system's internal routine would be coordinated with human performed external procedures if calibration is elected.

Figure 12:
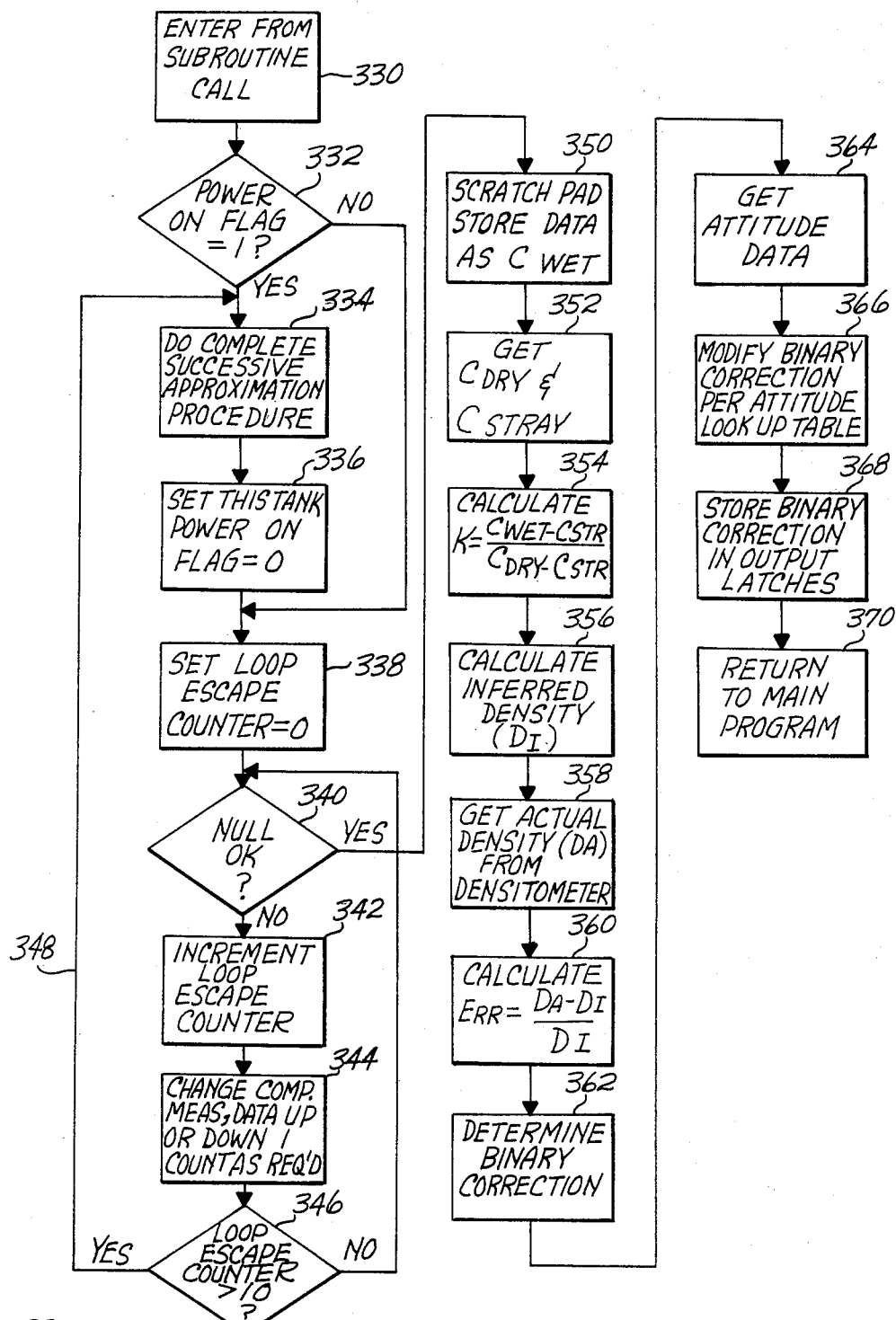
FIG. 12 is a logic flow diagram of the density correction subroutine, as identified in FIG. 11.

If no calibration switch position has been selected, the system performs the density correction subroutine at block 314. The details of the density correction subroutine are shown in FIG. 12. Upon completion of the density correction subroutine, the system returns to increment the tank counter 306 and continues.

If, at block 312, a calibration switch position has been selected, a test is run at block 316 to determine whether or not calibration mode 1 switch is closed. If it is, the system performs the calibration mode 1 subroutine at block 318. The calibration mode 1 subroutine is described in detail with respect to FIG. 13. Upon completion of this subroutine the system returns to increment the tank counter 306 and continues. If the calibration mode number 1 switch has not been closed at block 316, a test is done at block 320 to determine whether or not the calibration mode 2 switch is closed. If it is, the calibration mode 2 subroutine is performed at block 322. This subroutine is described in detail with respect to FIG. 14. Again, once the subroutine is performed, with tank counter is incremented at 306 and the system continues.

Finally, if the calibration mode 2 switch was not closed, at block 324 a determination is made as to whether or not the calibration mode 3 switch is closed. If it is, the calibration mode 3 subroutine is performed at block 326. This subroutine is described in detail with respect to FIG. 15. In either case, the system increments the tank counter at block 306 and continues.

FIG. 12 is a logic flow diagram of the density correction subroutine, block 314 of FIG. 11. This subroutine is entered through block 330 and a determination is made at block 332 as to whether the power-on flag equals one. Recognition of power-on flags and the control of all the input-output multiplexing and data storage is by reference to the main program tank counter.

If the power-on flag does equal one, a successive approximation procedure is performed at block 334. This is the initial determination of the binary data which is supplied to the compensator measurement signal block of FIG. 3. Usually this will only need to be done once, after power has been off, unless there is a very abrupt change that cannot be tracked by small changes in a binary word.

After the approximation procedure, the tank power-on flag is set to zero, at block 336.

Following block 336, or if the power-on flag did not equal one at block 332, a loop escape counter is set at zero at block 338. This counter avoids the system being trapped in an increment or decrement one count at a time loop, where capacitance is changed suddenly, such as during calibration.

Next, a determination is made as to whether or not a null has been achieved, at block 340, via the compensator measurement null sense block of FIG. 3. If a null has not been achieved, the loop escape counter is incremented at block 342 and the binary compensator measurement data is incremented or decremented, as indicated by the polarity of the non-null voltage, at block 344. A test is then done at block 346 to determine whether or not the loop counter is greater than an arbitrary number, here 10. Thus, if the counter is greater than 10, the system, through loop 348, returns to the successive approximation procedure block 334. If not, the system returns to check null at block 340.

If the null check at block 340 indicates that a null has been achieved, the processor determines and holds the value of the binary compensator measurement data, representing the fuel-immersed compensator capacitance, as $C_{wet}$ at block 350. The processor then recalls the stored values of $C_{dry}$ and $C_{stray}$ from memory, which values were determined during the calibration mode 1 and calibration mode 2 subroutines described hereafter, at block 352.

At block 354, the value of dielectric constant K is calculated as:

$$K = \frac{C_{wet} - C_{stray}}{C_{dry} - C_{stray}}.$$

With the value of K calculated, the processor at block 356 calculates the inferred density $D_I$. The inferred density is that density (FIG. 1) assumed to correspond to the dielectric constant. In the case of a particular fuel gaging system, the formula for inferred density is given as:

$$D_I = \frac{K - 1}{b + a(K - 1)},$$

where a and b are predetermined constants.

The actual density value $D_A$, which is supplied as an input from the densitometer, is collected at block 358.

Now, in block 360, an error $E_{RR}$ is calculated relating to the difference in actual density and inferred density. This error is calculated as:

$$E_{RR} = \frac{D_A - D_I}{D_I}.$$

The value of $E_{RR}$ yields an error with positive sign when the fuel is heavier than is indicated by its dielectric constant. This will cause an underreading of the gage before applying the correction. The correction is of such a sense as to deliver a current to the summing point that is opposite in phase to the current through the compensator. Thus, an increase in rebalance voltage (gage reading) is required to restore the null at the input to the gage servo amplifier. The actual scaling of the binary correction depends upon how much error the system designer intends to cope with in his system. In one system, 3% was selected.

This binary correction signal is generated at block 362.

At block 364, the processor collects the attitude data. This results in the binary correction signal being modified pursuant to the attitude correction look-up table at block 366. Output latches which store the correction signal are at block 368. Upon completion of the density correction subroutine, the processor returns to the main program at block 370.

Figure 13:
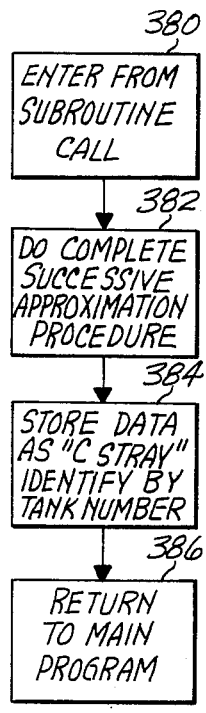
FIG. 13 is a logic flow diagram of the calibration mode 1 subroutine, as identified in FIG. 11.

FIG. 13 details the flow logic of the calibration mode 1 subroutine. This subroutine is used to establish the amount of stray capacitance between the compensator LO Z and the HI Z wires of FIG. 3, external to the tank. This requires that the compensator LO Z wire be disconnected at the point of tank entry. The stray capacitance is measured during density correction, along with any stray capacitance inside the tank, with the compensator, and would degrade accuracy if not accounted for in the density correction.

The subroutine is entered at block 380. Then, a complete successive approximation procedure is run at block 382. This procedure utilizes the compensator measurement null sense and compensator measurement signal blocks of FIG. 3 to measure capacitance, the difference being that the compensator LO Z wire is disconnected at the point of tank entry.

The measured capacitance is stored as $C_{stray}$ at block 384 and the system returns to the main program at block 386.

Figure 14:
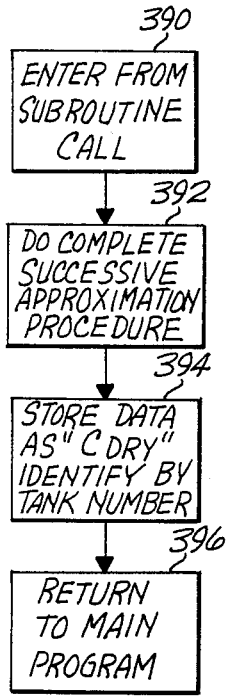
FIG. 14 is a logic flow diagram of the calibration mode 2 subroutine, as identified in FIG. 11.

FIG. 14 is a logic flow diagram of the calibration mode 2 subroutine. Calibration mode 2 is used to establish the entire amount of capacitance between the compensator LO Z wire and the HI Z wire of FIG. 3, with the compensator in place but not wetted by fuel. Thus, the subroutine is entered at block 390. At block 392, the successive approximation procedure, utilizing the compensator measurement null sense and the compensator measurement signal blocks of FIG. 3, is run.

The resulting measured capacitance is stored, at block 394, as $C_{dry}$ and this value is stored with reference to the particular tank of a multi-tank system. Thereafter, the system, at block 396, returns to the main program.

Figure 15:
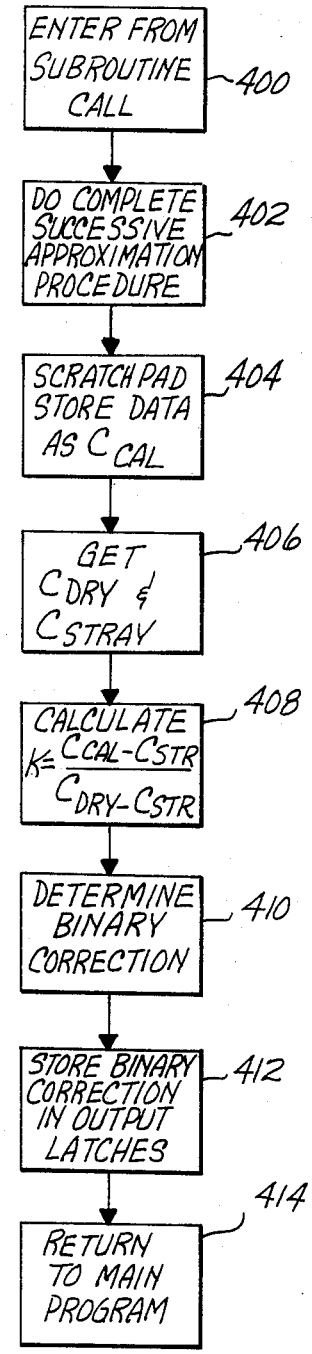
FIG. 15 is a logic flow diagram of the calibration mode 3 subroutine, as identified in FIG. 11.

FIG. 15 is a logic flow diagram of the calibration mode 3 subroutine. The calibration mode 3 subroutine is used for processor-enhanced "full" adjustment of the gaging system.

The processor-enhanced full adjust subroutine is understood with respect to the prior approach to calibrating a gage such that it reads "full" or some predetermined quantity of fuel at, or near, tank capacity. This adjustment has been done with the use of a specialized fuel gage calibration instrument. This instrument makes connection to all three wires connecting the gage to fuel probes and the compensator. One capacitance in the calibrating instrument is connected in parallel with the compensator. This added capacitance is made equal to the increase that would occur in the capacitance of the compensator if the compensator were immersed in fuel of nominal dielectric constant. By this addition of capacitance from the test set a simulation is created, on the compensator side of the fuel gaging circuit, of the conditions that would prevail if the compensator were immersed in fuel having the nominal dielectric constant. However, this procedure is based on the nominal dry capacitance of the compensator, taking no account of its manufacturing tolerances. Also, the procedure takes no account of the unavoidable existence of a certain amount of stray capacitance.

Similarly, a capacitance in the calibration instrument is connected in parallel with the fuel probes. This added capacitance is made equal to the increase that would occur in the capacitance of the fuel probes if a known volume of fuel was in the tank, with this fuel having the nominal dielectric constant. Since, in the design of the fuel gaging system, it was assumed that a certain density was associated with a nominal dielectric constant, a certain definite mass of fuel is thus simulated. The full adjustment of the gage is then set to cause the gage to read that simulated fuel mass.

The deficiency in the above calibration procedure is that, if the tank was actually filled with fuel having the exact nominal dielectric constant, the increasing capacitance on the compensator side of the circuit would be different from the amount added during calibration, probably somewhat greater. The wetted stray capacitance always causes an increase, whereas the wetted unknown capacitance may represent either an increase or a reduction. The unknown capacitance is due to manufacturing tolerance on the dry capacitance of the compensator.

It can be shown that, due to the change in capacitance from the calibration condition when the stray and unknown capacitances in the system are wetted by fuel, an immediate error is introduced in the performance of the system. This error, due to stray capacitance and compensator tolerance, is largely determined by the presence of fuel, with only a relatively minor effect due to changes of the dielectric constant of the fuel.

The calibration mode 3 subroutine provides a means to use the same circuits as used for density correction to allow making the "full adjustment" of the gage with fuel in the tank.

In the present fuel-in-tank full adjust procedure, the LO Z wire that provides excitation voltage to the tank units is disconnected. A capacitance in the calibration instrument is connected to replace the function of the fuel probes. This substitute fuel probe capacitance simulates the sum of the dry capacitance of the fuel probes plus the amount of capacitance that would have been added during the earlier dry tank calibration procedure.

In this calibration mode, the processor, as before, measures the dielectric constant of the fuel. It compares this result with the stored number for the nominal dielectric constant and establishes a correction factor such that the sum of the currents through the nominal compensator capacitance and through the correction factor control is equal to the current that would flow in the nominal compensator if it were immersed in fuel of nominal dielectric constant. The "full adjustment" on the gage is set to make the gage indicate the standard calibration mass represented by the simulated fuel probe capacitance in the calibration instrument. The principal difference between this procedure and that performed prior to this invention is that stray and unknown capacitance in the tank is wetted with fuel, thereby eliminating errors caused by capacitor variance due to component wetting.

FIG. 15 details the logical steps. The calibration mode 3 subroutine is entered at block 400. As before, a successive approximation procedure is performed at block 402, under the above described calibration mode 3 system configuration. The resulting value is stored, at block 404, as a value $C_{cal}$.

The processor then recalls from memory the values of $C_{dry}$ and $C_{stray}$ at block 406.

At block 408, a dielectric constant is determined from the equation:

$$K = \frac{C_{cal} - C_{stray}}{C_{dry} - C_{stray}}.$$

The processor, either by stored formula or look-up table, determines a correction value for the dielectric constant calculated at block 408. This happens at block 410. The resulting binary correction data is stored in output latches at block 412 and the system returns to the main program at block 414.

In summary, an improved capacitive probe fuel gaging system has been disclosed. The system is capable of correcting for fuel which does not conform to the assumed fuel density/fuel dielectric constant relationship. In addition, the system is capable of correcting for errors caused by the attitude of the system, or of stray capacitances, or errors due to variance in capacitance when system components are wetted with fuel.

Whereas the preferred embodiment of the invention has been described in detail, it should be apparent that many modifications and variations thereto are possible, all of which fall within the true spirit and scope of the invention.

I claim:

1. In a fuel gaging system wherein fuel quantity is determined by measuring the capacitance of a capacitive probe in the fuel tank and relating such capacitance to fuel mass by a predetermined fuel density/fuel dielectric constant relationship, the improvement comprising:
    means for producing a signal K representative of the actual dielectric constant of the fuel;
    means for producing a signal $D_A$ representative of the actual density of the fuel; and
    processor means for processing said K and $D_A$ signals and determining whether said predetermined relationship is valid for the particular fuel in the tank and, if said predetermined relationship is invalid, applying a predetermined correction signal to said gaging system such that said system indicates actual fuel mass.

2. In the system of claim 1 wherein said fuel gaging system is subject to error due to the attitude of the system, the improvement further comprising:
    means for producing an attitude signal representative of the attitude of the system; and
    wherein said processor means is responsive to said attitude signal such that said predetermined correction signal corrects for said attitude error.

3. Apparatus for producing an indication of the quantity of fuel in a tank comprising:
    a capacitive fuel probe in the tank, the probe exhibiting a capacitance which is a function of fluid level in the tank and of the dielectric constant of the fuel;
    a compensator capacitor connected in series with said capacitive fuel probe and positioned in the tank such that it is wetted by fuel for all fuel levels, the compensator capacitor exhibiting a capacitance which is a function of the dielectric constant of the fuel;
    means for applying a predetermined level periodic A.C. signal to the free end of the capacitive fuel probe;
    variable signal means for applying a 180° phase shifted variable level of said periodic A.C. signal to the free end of the compensator capacitor;
    means for controlling the signal level produced by said variable signal means such that a signal null is produced at the junction of the capacitive fuel probe and the compensator capacitor, the level of signal produced by the variable signal means being indicative of fuel quantity in the tank;
    means for determining the actual dielectric constant K of the fuel, said means including means for producing a sense signal in quadrature with said periodic A.C. signal and applying said sense signal to said compensator capacitor and further means for processing said sense signal and determining said dielectric constant K in response thereto;

means for determining the actual density $D_A$ of the fuel; and correction signal means for producing a correction signal responsive to the actual dielectric constant and density of the fuel and using said signal as a correction factor to the fuel quantity indication.

4. The apparatus of claim 3 wherein:

the means for determining the actual dielectric constant of the fuel includes:

(a) means for producing a fixed level sense signal in quadrature with said periodic A.C. signal;

(b) means for multiplexing the variable level periodic A.C. signal applied to the free end of the compensator capacitor with said sense signal;

(c) sense signal means for applying a 180° phase shifted variable level of said sense signal to the junction of the capacitive fuel probe and the compensator capacitor; and (d) control means for controlling said sense signal level means such that the level of signal produced thereby is nulled by that portion of the fixed level sense signal coupled through the compensator capacitor, said control means including means for producing a signal representative of the actual dielectric constant of the fuel responsive to the level of the variable signal required to produce said null.

5. The apparatus of either of claims 3 or 4 wherein said apparatus is subject to error due to the attitude of the apparatus, the apparatus further comprising:

means for determining the attitude of the apparatus; and wherein said correction signal means includes means for responding to said determined attitude of the apparatus and varying said correction signal in response thereto to correct the fuel indication for the attitude error.

6. The apparatus of claim 5 further comprising means operable in a full adjust calibration mode for:

(a) simulating the capacitance produced by the fuel probes as that capacitance representative of a full tank, with a predetermined nominal dielectric constant of the fuel;

(b) determining the actual dielectric constant of the fuel;

(c) comparing said actual dielectric constant with the predetermined dielectric constant;

(d) producing a signal representative of the full tank level responsive to the result of comparison step (c);

(e) setting the fuel indication apparatus to read the "full" value responsive to said signal produced in step (d).

7. In the system of claim 6 wherein said fuel gaging system is subject to error due to the attitude of the system, the method further comprising the step of:

(d) producing an attitude signal representative of the attitude of the system;

and wherein said step (c) further comprises the step of responding to said attitude signal such that said predetermined correction signal corrects for said attitude error.

8. The apparatus of either of claims 3 or 4 further comprising:

means for determining the stray capacitance in parallel with said compensator capacitor and storing the value as $C_{stray}$;

means for determining the total capacitance across said compensator capacitor with said compensator capacitor dry and storing the value as $C_{dry}$;

means for storing the wetted capacitance of said capacitive fuel probe as $C_{wet}$;

means for calculating the actual dielectric constant K of the fuel as;

$$K = \frac{C_{wet} - C_{stray}}{C_{dry} - C_{stray}};$$

means for determining an inferred value, $D_I$, of fuel density from the calculated value of K; and said correction signal means comparing said inferred density $D_I$ with the actual density $D_A$ and producing said correction signal in response thereto.

9. The apparatus of claim 8 further comprising means operable in a full adjust calibration mode for:

(a) simulating the capacitance produced by the fuel probe as that capacitance representative of a full tank, with a predetermined nominal dielectric constant of the fuel;

(b) determining the actual dielectric constant of the fuel;

(c) comparing said actual dielectric constant with the predetermined dielectric constant;

(d) producing a signal representative of the full tank level responsive to the result of comparison step (c); and (e) setting the fuel indication apparatus to read the "full" value responsive to said signal produced in step (d).

10. The apparatus of claim 5 wherein the means for determining an inferred value of fuel density includes means for calculating said inferred value as:

$$D_I = \frac{K - 1}{b + a(K - 1)},$$

where a and b are predetermined constants.

11. The apparatus of claim 10 further comprising means operable in a full adjust calibration mode for:

(a) simulating the capacitance produced by the fuel probe as that capacitance representative of a full tank, with a predetermined nominal dielectric constant of the fuel;

(b) determining the actual dielectric constant of the fuel;

(c) comparing said actual dielectric constant with the predetermined dielectric constant;

(d) producing a signal representative of the full tank level responsive to the result of comparison step (c); and (e) setting the fuel indication apparatus to read the "full" value responsive to said signal produced in step (d).

12. The apparatus of either of claims 8 wherein said apparatus is subject to error due to the attitude of the apparatus, the apparatus further comprising:

means for determining the attitude of the apparatus; and wherein said correction signal means includes means for responding to said determined attitude of the apparatus and varying said correction signal in response thereto to correct the fuel indication for the attitude error.

13. The apparatus of claim 12 further comprising means operable in a full adjust calibration mode for:
   (a) simulating the capacitance produced by the fuel probes as that capacitance representative of a full tank, with a predetermined nominal dielectric constant of the fuel;
   (b) determining the actual dielectric constant of the fuel;
   (c) comparing said actual dielectric constant with the predetermined dielectric constant;
   (d) producing a signal representative of the full tank level responsive to the result of comparison step (c);
   (e) setting the fuel indication apparatus to read the "full" value responsive to said signal produced in step (d).

14. In a fuel gaging system wherein fuel quantity is determined by measuring the capacitance of a capacitive probe in the fuel tank and relating such capacitance to fuel mass by a predetermined fuel density/fuel dielectric constant relationship, a method for correcting fuel gaging errors due to a deviation of the actual fuel in the tank from said predetermined relationship, the method comprising the steps of:
   (a) producing a signal K representative of the actual dielectric constant of the fuel;
   (b) producing a signal $D_A$ representative of the actual density of the fuel; and
   (c) processing said K and $D_A$ signals and determining whether said predetermined relationship is valid for the particular fuel in the tank and, if said predetermined relationship is invalid, applying a predetermined correction signal to said gaging system such that said system indicates actual fuel quantity.

* * * * *